(12) United States Patent
Yazawa et al.

(10) Patent No.: US 11,010,880 B2
(45) Date of Patent: May 18, 2021

(54) IMAGE PROCESSING APPARATUS, IMAGE PROCESSING METHOD, AND STORAGE MEDIUM THAT GENERATE COMPRESSION CURVES OF RESPECTIVE DIVIDED REGIONS SO THAT RESPECTIVE SLOPES OF THE COMPRESSION CURVES MATCH IN A PARTICULAR LUMINANCE RANGE

(71) Applicant: CANON KABUSHIKI KAISHA, Tokyo (JP)

(72) Inventors: Maya Yazawa, Kawasaki (JP); Tetsuya Suwa, Yokohama (JP); Hidetsugu Kagawa, Kawasaki (JP); Shuhei Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/458,965

(22) Filed: Jul. 1, 2019

(65) Prior Publication Data

US 2020/0013149 A1 Jan. 9, 2020

(30) Foreign Application Priority Data

Jul. 6, 2018 (JP) .............................. JP2018-129468

(51) Int. Cl.
*G06T 5/00* (2006.01)
*G06T 5/40* (2006.01)
(Continued)

(52) U.S. Cl.
CPC .......... *G06T 5/009* (2013.01); *G06K 15/1822* (2013.01); *G06T 5/40* (2013.01);
(Continued)

(58) Field of Classification Search
CPC ...... G06K 15/1822; G06T 2207/10024; G06T 2207/20021; G06T 2207/20092;
(Continued)

(56) References Cited

U.S. PATENT DOCUMENTS 6,285,798 B1 * 9/2001 Lee .......................... G06T 5/004
382/260
7,636,496 B2 * 12/2009 Duan ...................... G06T 5/007
345/589

(Continued)

FOREIGN PATENT DOCUMENTS

JP 4641784 B2 3/2011

*Primary Examiner* — Bobbak Safaipour
(74) *Attorney, Agent, or Firm* — Venable LLP

(57) ABSTRACT

An image processing apparatus includes an input unit for inputting an image, a division unit for dividing the inputted image into a plurality of divided regions, an obtaining unit for obtaining a feature amount of the image for each of the divided regions, a generation unit for generating a compression curve for each divided region, and a compression unit for generating an output image by performing compression of a dynamic range using the compression curve for each of the divided regions. The generation unit generates the compression curve for each of the divided regions so that a slope of the compression curve for each of the divided regions matches in a range from a luminance of a dark region of the image to a luminance of a predetermined brightness.

24 Claims, 8 Drawing Sheets

(51) Int. Cl.
*G06K 15/02* (2006.01)
*H04N 1/60* (2006.01)

(52) U.S. Cl.
CPC . *H04N 1/6027* (2013.01); *G06T 2207/10024* (2013.01); *G06T 2207/20021* (2013.01); *G06T 2207/20092* (2013.01); *G06T 2207/20208* (2013.01)

(58) Field of Classification Search
CPC . G06T 2207/20208; G06T 5/009; G06T 5/40; H01M 8/04283; H01M 8/241; H04N 1/6027; H04N 1/644
See application file for complete search history.

(56) References Cited

U.S. PATENT DOCUMENTS

| | | | | |
|---|---|---|---|---|
| 8,081,839 B2* | 12/2011 | Hasegawa | ............... | G06T 5/40 382/274 |
| 8,165,418 B2* | 4/2012 | Hasegawa | ............... | G06T 5/009 382/274 |
| 8,437,031 B2* | 5/2013 | Hasegawa | ............... | H04N 1/6086 358/1.2 |
| 2005/0012963 A1* | 1/2005 | Yamads | ............... | H04N 1/6072 358/2.1 |
| 2008/0056615 A1* | 3/2008 | Kuno | ............... | H04N 1/4072 382/298 |
| 2008/0199074 A1* | 8/2008 | Mitsunaga | ............... | H04N 21/4402 382/169 |
| 2015/0242701 A1* | 8/2015 | Tokui | ............... | H04N 1/4072 382/190 |
| 2020/0013150 A1* | 1/2020 | Kagawa | ............... | H04N 1/6027 |

* cited by examiner

HISTOGRAM

D RANGE COMPRESSION CURVE

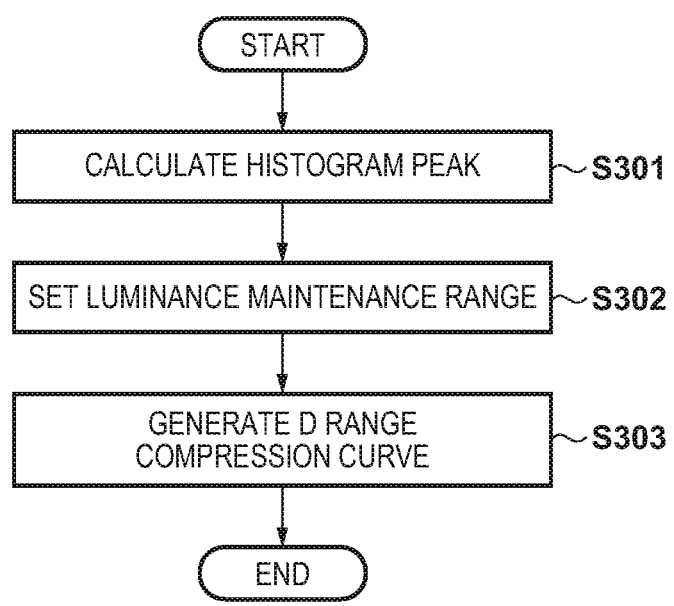

HISTOGRAM

D RANGE COMPRESSION CURVE

HISTOGRAM

D RANGE COMPRESSION CURVE

IMAGE PROCESSING APPARATUS, IMAGE PROCESSING METHOD, AND STORAGE MEDIUM THAT GENERATE COMPRESSION CURVES OF RESPECTIVE DIVIDED REGIONS SO THAT RESPECTIVE SLOPES OF THE COMPRESSION CURVES MATCH IN A PARTICULAR LUMINANCE RANGE

This application claims the benefit of Japanese Patent Application No. 2018-129468, filed Jul. 6, 2018, which is incorporated by reference herein in its entirety.

BACKGROUND OF THE INVENTION

Field of the Invention

The present invention relates to a technique for printing image data having a wide dynamic range, by a printing apparatus.

Description of the Related Art

In recent years, HDR (High Dynamic Range) content having a high luminance and a reproduction range with a wide color gamut is becoming widespread. With HDR content, a maximum luminance represents 1000 nit or more. When printing HDR image data by an inkjet printing apparatus, to fit within a dynamic range (hereafter described as a D range) for luminance that the printing apparatus can reproduce, it is necessary to perform D range compression using a tone curve. In such a case, when D range compression by a normal method is performed, there is a problem in that contrast decreases.

Accordingly, in order to reduce a decrease of contrast at a time of D range compression, a method of performing D range compression locally has been proposed. For example, D range compression is performed after dividing an input image into a plurality of regions, and deciding a lookup table for each divided region. Such processing is disclosed by Japanese Patent No. 4641784, for example.

When performing D range compression based on a feature amount such as a distribution of luminance values in a region, as disclosed by Japanese Patent No. 4641784, the more a histogram of luminance values in a region is unbalanced, the more it is possible to perform D range compression while maintaining the contrast. This is because it is possible to perform D range compression that does not cause the contrast to decrease, with respect to luminance values whose frequency is high in the histogram for the region. In such a case, a D range compression curve is generated to compress, at a high compression rate, luminance values whose frequency in the histogram for the region is low.

A method of generating a D range compression curve in accordance with histogram distribution is described using FIGS. 10A and 10B. FIG. 10A illustrates a histogram distribution of certain regions, and FIG. 10B illustrates a D range compression curve generated from that histogram distribution. Letting a D range that can be represented by a printing apparatus such as a printer be D1, if histogram distributions of certain regions are, respectively, H1 and H2, D range compression curves as respectively indicated by L1 and L2 are generated in accordance with histogram frequency. In the case of a histogram distribution as with H1, because there is a tendency for a histogram frequency to be high at the highlights, a D range compression curve is generated as with L1 so that the contrast increases at a highlight portion. In the case of a histogram distribution as with H2, because there is a tendency for a histogram frequency to be high in shadows, a D range compression curve is generated as indicated by L2 so that the contrast increases at a shadow portion. However, as a result, a situation when the brightness differs between regions occurs. Let an exposure point in alignment with exposure for when capturing by a camera be P in FIG. 10. Normally, the exposure point is referred to as 18% grey. Specifically, when D range compression is performed by the L1 and L2 D range compression curves, the brightness at the exposure point P respectively becomes Y1 and Y2, and different brightnesses between regions occur. In other words, variation occurs in the brightness of an exposure point in accordance with a region, and a problem in that the brightness visibly differs for each region occurs.

SUMMARY OF THE INVENTION

The present invention is made in consideration of the problem described above, and provides an image processing apparatus capable of reducing variation in brightness between regions when compressing an input image by a compression curve that differs for each region.

According to a first aspect, the present invention provides an image processing apparatus comprising at least one processor or circuit configured to function as the following units, an input unit configured to input data of an input image, a division unit configured to divide the input image into a plurality of divided regions based on the data of the input image, an obtaining unit configured to obtain a feature amount of the input image for each of the divided regions, a generation unit configured to generate a compression curve defining luminance of an output image corresponding to a luminance of the input image, wherein a range of the luminance of input image is narrower than a range of the luminance of output image based on the feature amount, for each divided region, and a compression unit configured to perform operation for compression of a dynamic range to generate data of the output image using the compression curve for each of the divided regions, on the inputted image, wherein the generation unit generates the compression curves of the respective divided regions so that the respective slopes of the compression curves of the divided regions match in a range from a luminance of a dark region of the image to a luminance of a predetermined brightness which is brighter than the luminance of the dark region.

According to a second aspect, the present invention provides an image processing method comprising inputting data of an input image, dividing the inputted image into a plurality of divided regions based on the data of the input image, obtaining a feature amount of the input image for each of the divided regions, generating a compression curve defining luminance of output image corresponding to a luminance of the input image, wherein a range of the luminance of input image is narrower than a range of the luminance of output image based on the feature amount, for each divided region, and performing operation for compression of a dynamic range to generate data of the output image using the compression curve for each of the divided regions, on the inputted image, wherein the compression curves of the respective divided regions is generated so that the respective slopes of the compression curves of the divided regions match in a range from a luminance of a dark region of the image to a luminance of a predetermined brightness which is brighter than the luminance of the dark region.

Further features of the present invention will become apparent from the following description of exemplary embodiments with reference to the attached drawings.

BRIEF DESCRIPTION OF THE DRAWINGS

FIG. 8 is a flowchart illustrating a D range compression curve generation method in the second embodiment.

DESCRIPTION OF THE EMBODIMENTS

Hereafter, referring to the attached drawings, embodiments of the present invention will be described in detail.

First Embodiment

[Description of System Configuration]

Figure 1:
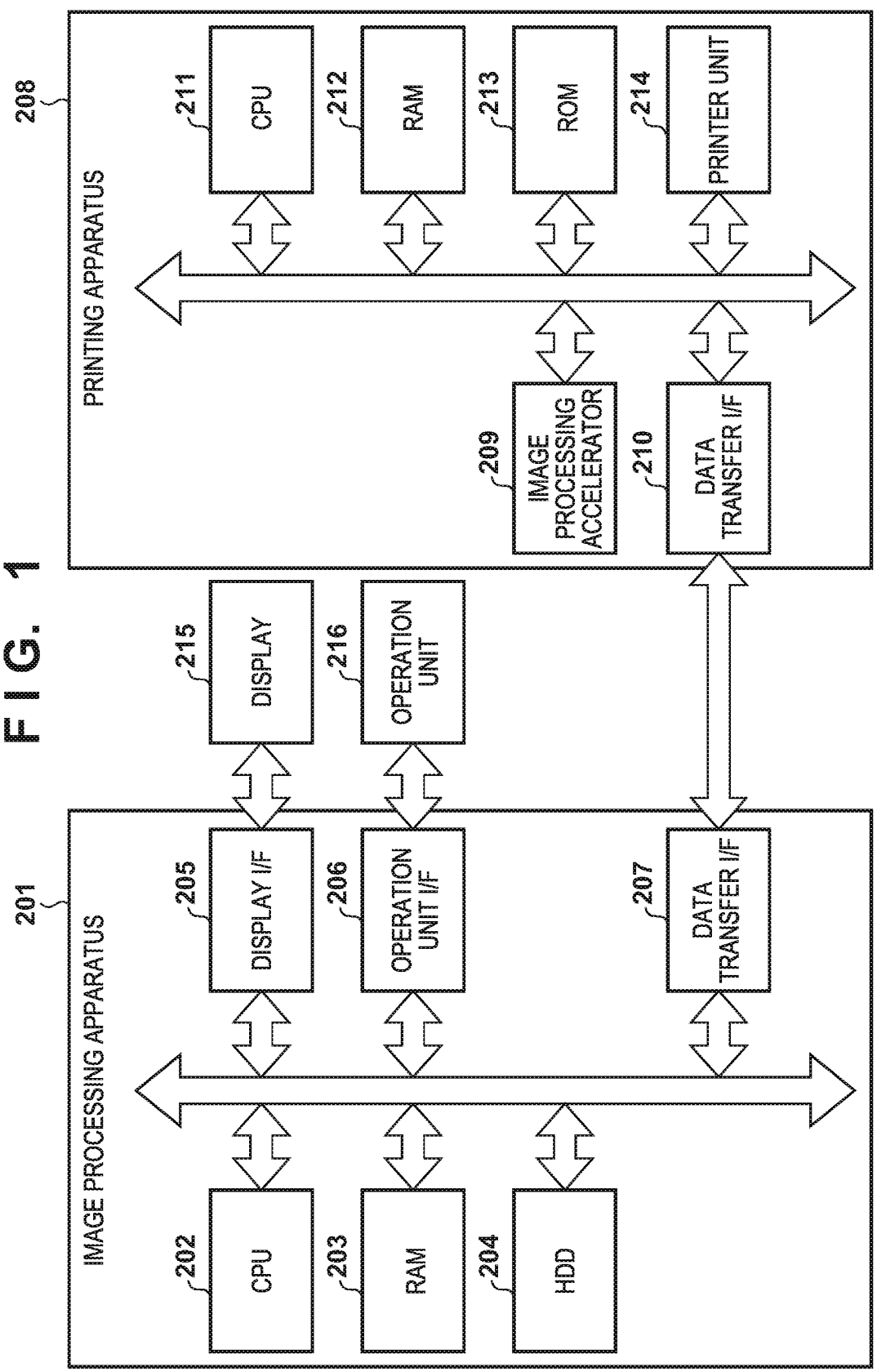
FIG. 1 is a view illustrating a configuration of a print system in which an image processing apparatus of a first embodiment of the present invention is applied.

FIG. 1 is a view illustrating a configuration of a print system in which an image processing apparatus of a first embodiment of the present invention is applied. In the present embodiment, the print system is configured by including an image processing apparatus 201 and a printing apparatus (a printing apparatus) 208. The image processing apparatus 201 is configured from a host PC, or the like, which functions as an information processing apparatus. The image processing apparatus 201 is configured by including a CPU 202, a RAM 203, an HDD 204, a display I/F 205, an operation unit I/F 206, and a data transfer I/F 207, and each unit is communicably connected via an internal bus.

The CPU 202 executes various processing, using the RAM 203 as a work area, in accordance with a program held in the HDD 204. The RAM 203 is a volatile storage region, and is used as a work memory, or the like. The HDD 204 is a non-volatile storage region, and holds an OS (Operating System), a program according to the present embodiment, or the like. The display I/F 205 is an interface for transmitting and receiving data between a display 215 and the image processing apparatus 201. The operation unit I/F 206 is an interface for inputting, to the image processing apparatus 201, an instruction by a user who uses an operation unit 216 which is a keyboard, a mouse, or the like. The data transfer I/F 207 is an interface for transmitting and receiving data to and from an external apparatus.

For example, the CPU 202 generates image data (an image signal) that can be printed by the printing apparatus 208 in accordance with a program held in the HDD 204, or an instruction (a command, or the like) by a user who uses the operation unit 216, and transfers the image data to the printing apparatus 208. In addition, the CPU 202 performs predetermined processing, in accordance with a program stored in the HDD 204, on image data received from the printing apparatus 208 via the data transfer I/F 207, and displays a result of this processing or various information on the display 215.

The printing apparatus 208 is configured by including an image processing accelerator 209, a data transfer I/F 210, a CPU 211, a RAM 212, a ROM 213, and a printing unit 214, and each unit is communicably connected via an internal bus. A printing method of the printing apparatus 208 is not particularly limited, and the printing apparatus 208 may be an inkjet method printing apparatus and may be an electro-photographic method printing apparatus, for example. A description is given below by taking an inkjet method printing apparatus as an example.

The CPU 211 executes various processing, using the RAM 212 as a work area, in accordance with a program held in the ROM 213. The RAM 212 is a volatile storage region, and is used as a work memory, or the like. The ROM 213 is a non-volatile storage region, and holds an OS (Operating System), a program according to the present embodiment, or the like. The data transfer I/F 210 is an interface for transmitting and receiving data to and from an external apparatus.

The image processing accelerator 209 is hardware that can execute image processing at a higher speed than the CPU 211. The image processing accelerator 209 is activated by the CPU 211 writing a parameter and data needed for image processing to a predetermined address of the RAM 212, and after reading the foregoing parameter and data, the image processing accelerator 209 executes predetermined image processing on the foregoing data. However, the image processing accelerator 209 is not an essential element, and equivalent processing can also be executed by the CPU 211. The printing unit 214 performs a print operation based on an instruction from the image processing apparatus 201.

A connection method for the data transfer I/F 207 of the image processing apparatus 201 and the data transfer I/F 210 of the printing apparatus 208 is not particular limited, but, for example, it is possible to use USB (Universal Serial Bus), IEEE 1394, or the like. In addition, it may be a wired connection or a wireless connection.

Figure 2:
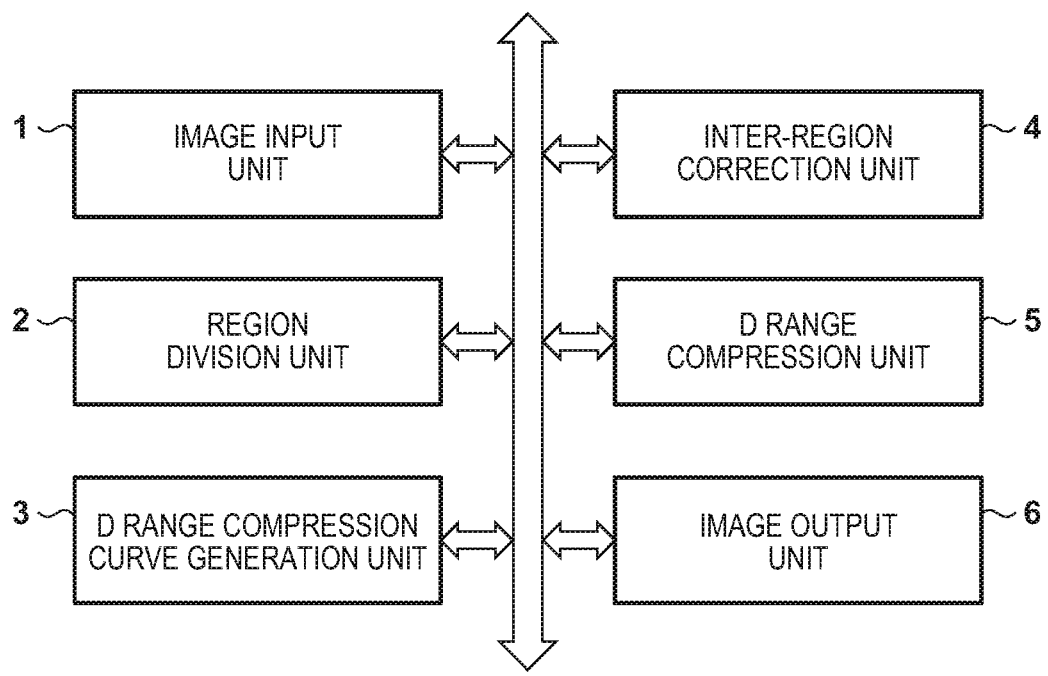
FIG. 2 is a view illustrating a configuration of functional blocks of the image processing apparatus.

Using the block diagram of FIG. 2 and the flowchart of FIG. 3, a description is given below in detail regarding operation of an image processing apparatus of the first embodiment. FIG. 2 is a block diagram for describing an image processing function for when inputting HDR image data (high dynamic range image data) to perform D range compression (dynamic range compression), and output image data after D range compression to the printing apparatus 208.

Figure 3:
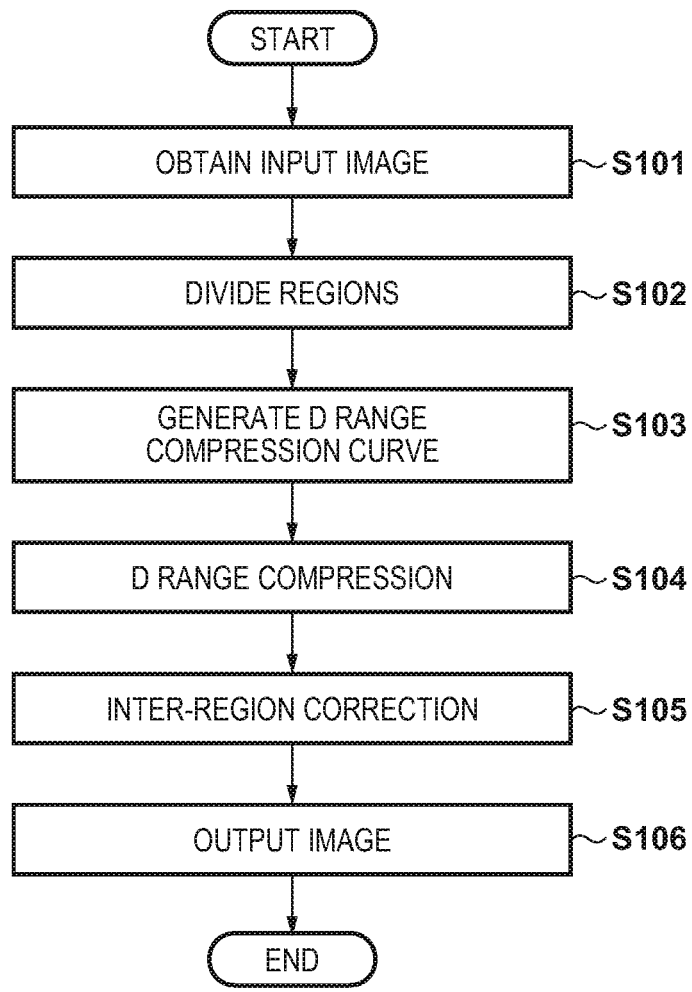
FIG. 3 is a flowchart illustrating a D range compression processing method.

In step S101 of FIG. 3, HDR image data captured by the image capturing apparatus is obtained by an image input unit 1. In the present embodiment, a description is given by taking the HDR image data as RGB data where the D range is 1000 nits, as an example. The inputted RGB data is decomposed into a luminance component and a color difference component in order to perform D range compression. Here, it is assumed that a PQ (Perceptual Quantization Curve) close to visual equivalence is used as a color space for when decomposing to the luminance component and the color difference component. However, there is no limitation to this, and a color space where a gamma characteristic is linear or a color space where a gamma value is 2.2 may be used.

Figure 4:
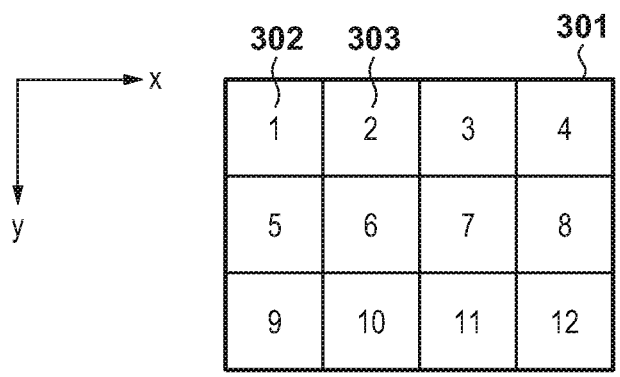
FIG. 4 is a view for describing region division of an input image.

In step S102, an input image 301 is divided into a plurality of regions by a region division unit 2. In the present embodiment, as illustrated by FIG. 4, a description is given by taking, as an example, a case when the input image 301 is divided into four regions in an x direction and three regions in a y direction for a total of 12 regions. A division method may be a method for dividing into regions of different sizes instead of equivalent sizes.

In step S103, the D range compression curve generation unit 3 generates a one-dimensional lookup table (hereafter described as an LUT) for performing D range compression on each region divided by the region division unit 2. A description is given later regarding details of a method of generating a D range compression curve.

In step S104, a D range compression unit 5 uses the LUT generated by the D range compression curve generation unit 3 to perform D range compression on each pixel in the region.

In step S105, an inter-region correction unit 4 performs correction between regions, with respect to the image subject to D range compression by the D range compression unit 5. Because D range compression is performed by an LUT generated by the D range compression curve generation unit for each region, artifacts (mismatches) such as pseudo contours occur due to differences in the LUTs for each region, at borders of regions. The inter-region correction unit 4 performs filter processing in order to achieve a reduction of artifacts.

Figure 5A:
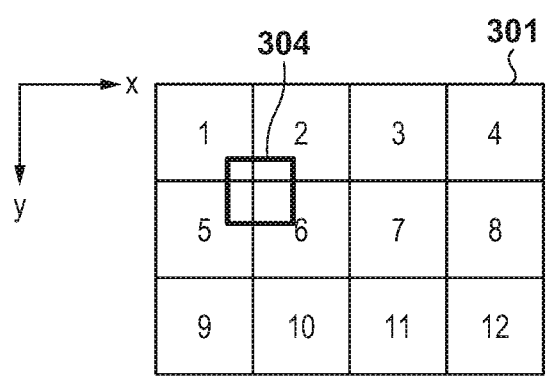
FIGS. 5A and 5B are views for describing an inter-region correction.
Figure 5B:
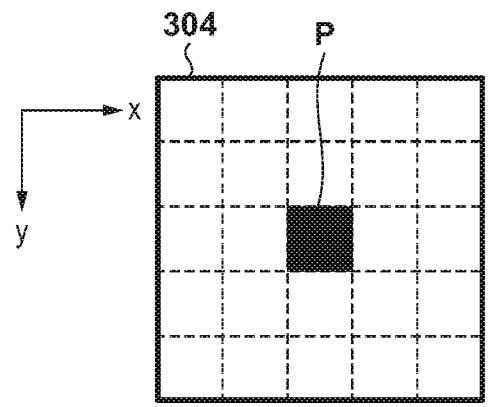

FIGS. 5A and 5B are used to give a description regarding the filter processing. A description is given regarding a correction method by taking as an example a case when a window 304 is positioned at a position indicated by FIG. 5A. The window 304 is a window with five pixels in the x direction and five pixels in the y direction, for example, that is centered on a pixel of interest P, which is a correction target, as illustrated by FIG. 5B. It is possible to reduce an artifact that occurs at a border of regions by setting a filter coefficient on each pixel of the window 304, and performing filter processing on a pixel of interest P. A smoothing filter where filter coefficient values are all set to the same value, a Gaussian filter that performs a normal distribution on coefficient values centered on a pixel of interest, or the like, may be used. In this way, artifacts that occur at the border of regions are reduced.

In step S106, an image output unit 6 outputs, to the printing apparatus 208, image data to which correction between regions has been performed by the inter-region correction unit 4.

Figure 6:
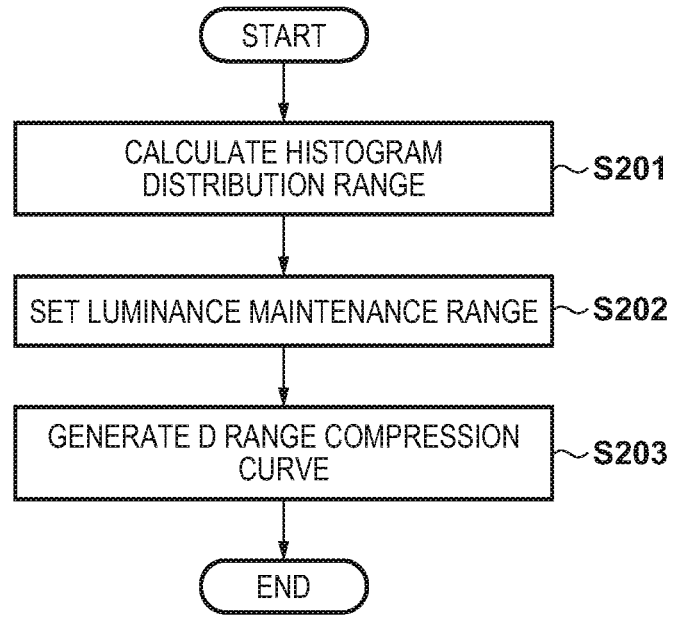
FIG. 6 is a flowchart illustrating a D range compression curve generation method in the first embodiment.

Next, the flowchart of FIG. 6 is used to give a description regarding the method of generating a D range compression curve, which is performed by the D range compression curve generation unit 3 in step S103.

First, in step S201, a distribution range (a feature amount) of a histogram of a target range is calculated. Specifically, a range of luminances at which X % (for example, 70%) of a total number of pixels are distributed is calculated, and a maximum luminance value is calculated for this range (a luminance distribution range). A calculation is performed by using a typical method such as a cumulative histogram as a method of calculating the range.

In step S202, the maximum luminance value calculated in step S201 is used to set a luminance maintenance range. In FIG. 7B, Pin represents an exposure point of an input image, and Pout represents a luminance value of an output image corresponding to Pin. In the luminance range from the minimum luminance of the input image to Pin, a D range compression curve is generated so that the contrasts of the input image and the output image match in all divided regions. In other words, in FIG. 7B, a slope is set to one for the D range compression curve in this range. In the present embodiment, a description is given with the slope set to one, but the slope does not need to be one. For example, a JND (Just Noticeable Difference), which is a function of a discrimination region index that is based on a Barten model, may be used. In a range where one step in the JND index is not exceeded, the luminance of the input and the output may be increased or decreased. In addition, a configuration may be taken so that the brightnesses of Pin and Pout are luminances that differ in a range of ±⅓ of a step, as the exposure can be changed in increments of ⅓ of a step for most cameras.

Figure 7A:
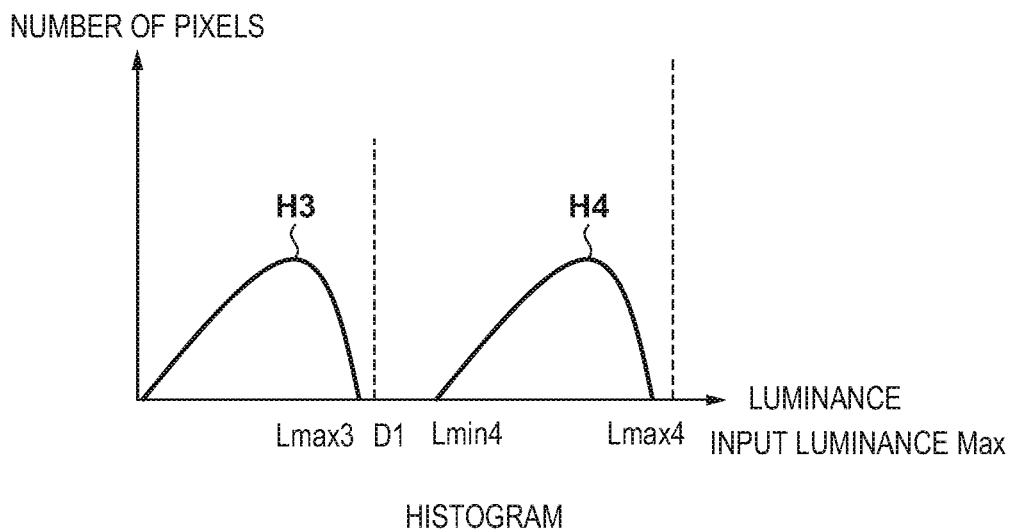
FIGS. 7A and 7B are views for describing luminance maintenance range setting processing in the first embodiment.
Figure 7B:
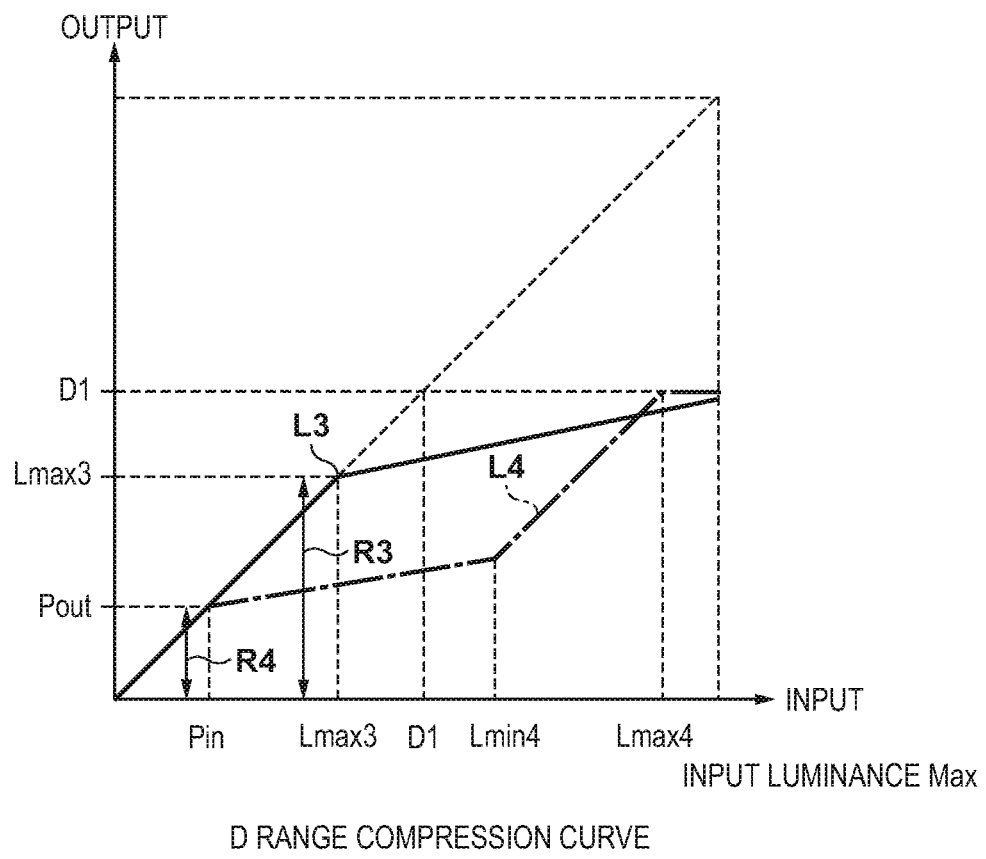

Assume that, in a case when the histogram distribution is a histogram H3 as illustrated by FIG. 7A, a maximum luminance value calculated in step S201 is Lmax3 and is less than or equal to a maximum luminance value D1 of an output that is allowed (less than or equal to a maximum luminance value). At this time, as illustrated by FIG. 7B, R3, which is a range from a minimum luminance of the input to Lmax3, which includes Pout is set as a luminance maintenance range, in other words a range where the slope is one. Meanwhile, assume that, in a case when the histogram distribution is a histogram H4 as illustrated by FIG. 7A, a maximum luminance value calculated in step S201 is Lmax4 and is greater than the maximum luminance value D1 of an output that is allowed. In such a case, as illustrated by FIG. 7B, R4, which is a range from a minimum luminance of the input to the exposure point Pout is set as a luminance maintenance range, in other words a range where the slope is one.

In step S203, a D range compression curve is generated using the luminance maintenance range set in step S202. Specifically, in the luminance maintenance range calculated in step S202, a straight line that has a slope of one is set so that there is a match with input luminance values. Regarding a range in excess of the luminance maintenance range, a D range compression curve is generated by connecting, from the maximum luminance value in the luminance maintenance range to the maximum luminance value D1 of the output, so that the maximum luminance value of the input becomes the maximum luminance value D1 of the output. A method of joining from the maximum luminance value in the luminance maintenance range to the maximum luminance value D1 of the output may be linear or non-linear. In a case when the histogram distribution is the histogram H3 illustrated in FIG. 7A, the D range compression curve becomes a D range compression curve L3 of FIG. 7B. In addition, in a case when the histogram distribution is the histogram H4 illustrated in FIG. 7A, a straight line where the slope is one may be set in order to hold the contrast of the input image in a range that exceeds the luminance maintenance range. Specifically, setting is such that the maximum luminance value Lmax4 in the histogram H4 becomes the maximum luminance value D1 in the output, and the range from the minimum luminance value Lmin4 to the maximum luminance value Lmax4 in the histogram H4 is set to be a straight line with a slope of one. For a region less than the minimum luminance value Lmin4 and greater than the luminance maintenance range, a D range compression curve is generated to connect that space linearly or non-linearly. As a result, the D range compression curve with respect to the histogram H4 illustrated in FIG. 7A becomes the D range compression curve L4 of FIG. 7B.

[Effect of First Embodiment]

It is possible to obtain a pixel distribution for luminance values in a divided region, by using a histogram distribution range for the luminance values. Accordingly, it is possible to generate an appropriate D range compression curve in accordance with each divided region, and it is also possible to maintain luminances up to a luminance maintenance range that includes an exposure point. As a result, in a luminance range that includes the exposure point, it is possible to align luminances between divided regions, and it possible to reduce visible variation of brightness.

Second Embodiment

Figure 9A:
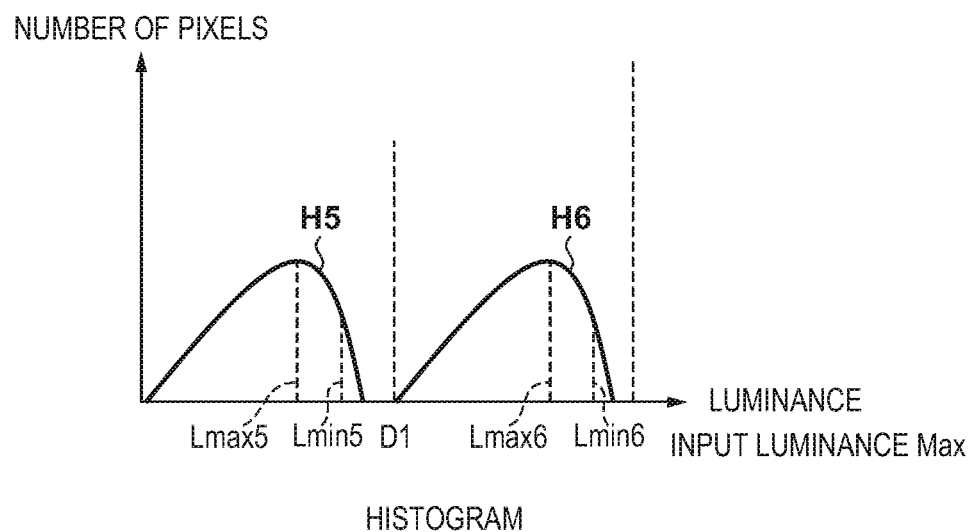
FIGS. 9A and 9B are views for describing the luminance maintenance range setting processing in the second embodiment.
Figure 9B:
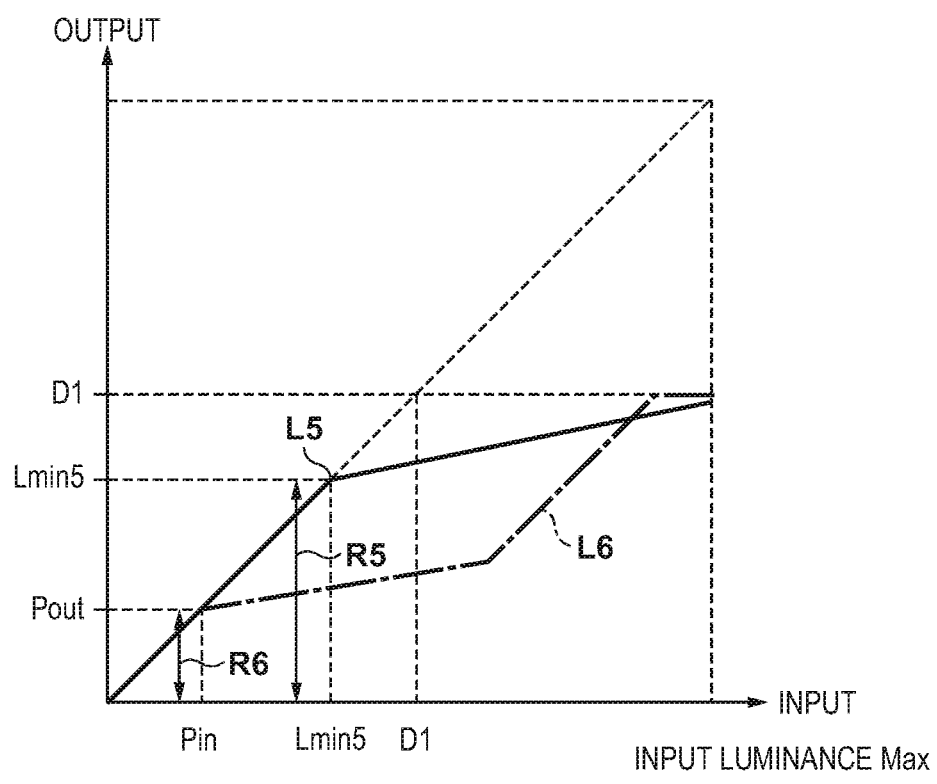
Figure 10A:
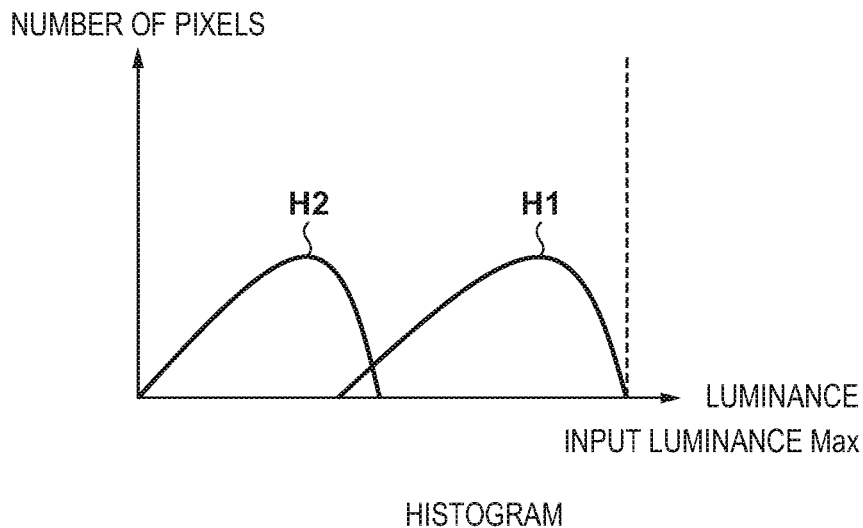
FIGS. 10A and 10B are views for describing processing for compressing a D range by a conventional method.
Figure 10B:
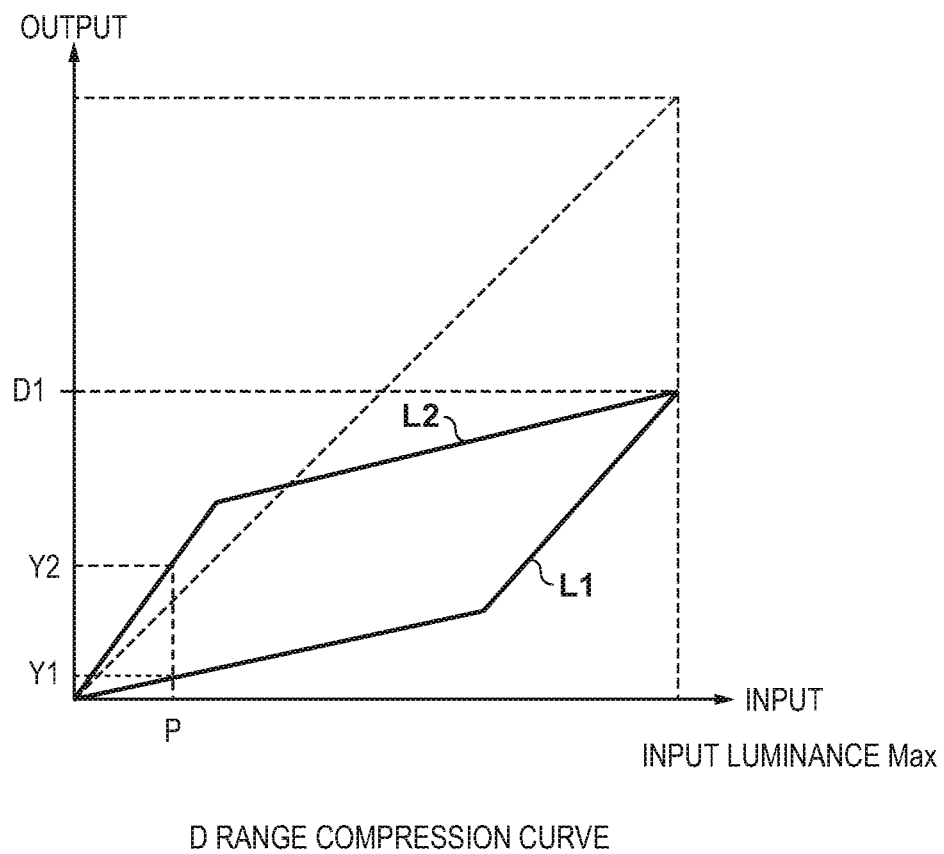

Next, the flowchart of FIG. 8 and FIGS. 9A and 9B are used to give a description regarding a second embodiment. In the second embodiment, step S101 to step S102 and step S104 through step S106 in FIG. 3 are similar to that in the first embodiment, and thus a description thereof is omitted.

Next, the flowchart of FIG. 8 is used to give a description regarding the method of generating a D range compression curve which is performed by the D range compression curve generation unit 3 in step S103.

In step S301, from the histogram of the luminance distribution of the target region, a peak position of the histogram is calculated. Specifically, a difference in frequency of appearance of the histogram is calculated in order from a smallest luminance value of the input, and the luminance value for which the difference is a maximum is calculated as a peak position. Furthermore, a luminance value that is greater than that of the peak position and for which a difference in frequency of appearance of the histogram is greater than a threshold value is calculated as a peak end position. For the threshold value, it is assumed that a value less than the maximum value of the difference is set.

In step S302, the luminance value of the peak calculated in step S301 is used to set a luminance maintenance range. In FIG. 9B, Pin represents an exposure point of an input image, and Pout represents a luminance value of an output image corresponding to Pin. In the luminance range from the minimum luminance of the input image to Pin, a D range compression curve is generated so that the contrasts of the input image and the output image match in all divided regions. In other words, FIG. 9B, a slope is set to one for the D range compression curve in this range. In the present embodiment, a description is given with the slope set to one, but the slope does not need to be one. For example, a JND (Just Noticeable Difference), which is a function of a discrimination region index that is based on a Barten model, may be used. In a range where one step in the JND index is not exceeded, the luminance of the input and the output may be increased or decreased. In addition, configuration may be taken so that the brightness of Pin and Pout are luminances that differ in a range oft ⅓ of a step, as the exposure can be changed in increments of ⅓ of a step for most cameras.

In a case when the histogram distribution is a histogram H5 illustrated in FIG. 9A, it is assumed that the peak position of the luminance value calculated in step S301 is Lmax5 and the peak end position is Lmin5, and both are less than or equal to the maximum luminance value D1 of the output. At this time, as illustrated by FIG. 9B, R5, which is a range from a minimum luminance of the input to Lmin5 which includes Pout is set as a luminance maintenance range, in other words a range where the slope is one. In contrast, in a case when the histogram distribution is a histogram H6 illustrated in FIG. 9A, it is assumed that the peak position of the luminance value calculated in step S301 is Lmax6 and the peak end position is Lmin6, and both are greater than the maximum luminance value D1 of the output. At this time, as illustrated by FIG. 9B, R6, which is a range from a minimum luminance of the input to the exposure point Pout is set as a luminance maintenance range, in other words a range where the slope is one.

In step S303, a D range compression curve is generated using the luminance maintenance range set in step S302. Because the method of generating the D range compression curve is similar to step S203 of FIG. 6, which was described in the first embodiment, detailed description thereof is omitted.

[Effect of Second Embodiment]

By using the peak position and the peak end position of a luminance histogram, it is possible to obtain a distribution of pixel values that have a high frequency of appearance in the divided region. Accordingly, if a pixel value that occupies a high proportion in the divided region is less than a maximum luminance value of the output, it is possible to maintain the luminance in a luminance maintenance range that includes an exposure point. In addition, even if a pixel value that occupies a high proportion in the divided region is greater than a maximum luminance value of the output, it is possible to maintain the luminance until the exposure point. Accordingly, it is possible to generate an appropriate D range compression curve in accordance with each divided region, and, in a luminance range that includes the exposure point, it is possible to align luminances between divided regions, and it is possible to reduce visible variation of brightness.

Third Embodiment

In the first and the second embodiment, in the description of a range, which is a range from a minimum input luminance to an exposure point Pin, for maintaining input luminance for each divided region, a description was given by setting Pin as 18% grey so as to align exposure with a proper exposure for a time of capturing. However, a luminance for Pin is not limited to this. For example, a value inputted from the operation unit 216 by a user may be set in a range that does not exceed the maximum luminance value D1 of output. In addition, it may be changed in accordance with a print mode of the printing apparatus 208, such as a portrait print mode. For example, because skin color is often brighter than 18% grey, in the case of the portrait print mode, the exposure point Pin may be set to a luminance value brighter than 18%.

[Effect of Third Embodiment]

By setting the luminance of the exposure point Pin to be higher than 18% grey, it is possible to widen the luminance range in which more luminances match between divided regions. In this way, it is possible to increase a degree of matching of luminances between divided regions.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   at least one processor or circuit configured to function as the following units:
   (a) an input unit configured to input data of an input image;
   (b) a division unit configured to divide the input image into a plurality of divided regions based on the data of the input image;
   (c) an obtaining unit configured to obtain a feature amount of the input image for each of the divided regions;
   (d) a generation unit configured to generate a compression curve defining luminance of an output image corresponding to a luminance of the input image, wherein a range of the luminance of the output image is narrower than a range of the luminance of the input image, based on the feature amount, for each divided region; and
   (e) a compression unit configured to perform operation for compression of a dynamic range to generate data of the output image using the compression curve for each of the divided regions, on the input image,
   wherein the generation unit generates the compression curves of the respective divided regions so that the respective slopes of the compression curves of the divided regions match in a range from a luminance of a dark region of the input image to a luminance of a predetermined brightness of the input image, which is brighter than the luminance of the dark region.

2. The image processing apparatus according to claim 1, wherein the generation unit sets the matching slopes of the respective compression curves of the divided regions such that a luminance of the input image is equal to a luminance of the output image in the range from the luminance of the dark region of the image to the luminance of the predetermined brightness.

3. The image processing apparatus according to claim 1, wherein the luminance of the predetermined brightness is a luminance that aligns an exposure to a proper exposure in a camera that captured the image.

4. The image processing apparatus according to claim 3, wherein the luminance of the predetermined brightness is a luminance of 18% grey.

5. The image processing apparatus according to claim 1, wherein the feature amount of the image is obtained based on a histogram indicating a distribution of luminance for each pixel.

6. The image processing apparatus according to claim 5, wherein the feature amount of the image is a width of a luminance distribution of the histogram.

7. The image processing apparatus according to claim 6, wherein, for the divided region where a maximum luminance value of a luminance distribution of the histogram is less than or equal to a maximum luminance value permitted in the output image, the generation unit sets the slope of the compression curve such that a luminance of the input image is equal to a luminance of the output image until the maximum luminance value.

8. The image processing apparatus according to claim 6, wherein, for the divided region where a maximum luminance value of a luminance distribution of the histogram is greater than a maximum luminance value permitted in the output image, the generation unit sets the slope of the compression curve to one until the luminance value of the predetermined brightness.

9. The image processing apparatus according to claim 5, wherein the feature amount of the image is a luminance value indicating where the histogram is a peak.

10. The apparatus according to claim 1, wherein the at least one processor or circuit is configured to further function as:
    (f) a setting unit configured to allow a user to set the luminance of the predetermined brightness.

11. The apparatus according to claim 1, wherein the at least one processor or circuit is configured to further function as:
    (f) a correction unit configured to correct a mismatch of signals at a respective boundary of the divided regions.

12. The apparatus according to claim 1, wherein the at least one processor or circuit is configured to further function as:
    (f) an output unit configured to output the output image to a printing apparatus.

13. The image processing apparatus according to claim 1, wherein the input image is a high dynamic range image.

14. The apparatus according to claim 1, wherein the generation unit generates the compression curves of the respective divided regions so that the respective slopes of the compression curves of the divided regions match in a range from the minimum luminance of the input image to a luminance of a predetermined brightness of the input image, which is brighter than the luminance of the dark region.

15. The image processing apparatus according to claim 14, wherein the luminance of the predetermined brightness is a luminance of exposure point of 18% grey in a capturing the image by the camera.

16. The image processing apparatus according to claim 1, wherein the luminance of the predetermined brightness is a luminance of exposure point of 18% grey in a capturing the image by the camera.

17. An image processing method comprising:
    inputting data of an input image;
    dividing the input image into a plurality of divided regions based on the data of the input image;
    obtaining a feature amount of the input image for each of the divided regions;

generating a compression curve defining luminance of an output image corresponding to a luminance of the input image, wherein a range of the luminance of the output image is narrower than a range of the luminance of the input image, based on the feature amount, for each divided region; and performing operation for compression of a dynamic range to generate data of the output image using the compression curve for each of the divided regions, on the input image, wherein the compression curves of the respective divided regions is generated so that the respective slopes of the compression curves of the divided regions match in a range from a luminance of a dark region of the input image to a luminance of a predetermined brightness of the input image, which is brighter than the luminance of the dark region.

18. The image processing method according to claim 17, wherein, in the generating, the compression curves of the respective divided regions are generated so that the respective slopes of the compression curves of the divided regions match in a range from the minimum luminance of the input image to a luminance of a predetermined brightness of the input image, which is brighter than the luminance of the dark region.

19. The image processing method according to claim 18, wherein the luminance of the predetermined brightness is a luminance of exposure point of 18% grey in a capturing the image by the camera.

20. The image processing method according to claim 17, wherein the luminance of the predetermined brightness is a luminance of exposure point of 18% grey in a capturing the image by the camera.

21. A non-transitory computer-readable storage medium storing a program for causing a computer to function as each unit of an image processing apparatus, the image processing apparatus comprising:

at least one processor or circuit configured to function as the following units:
 (a) an input unit configured to input data of an input image;
 (b) a division unit configured to divide the input image into a plurality of divided regions based on the data of the input image;
 (c) an obtaining unit configured to obtain a feature amount of the input image for each of the divided regions;
 (d) a generation unit configured to generate a compression curve defining luminance of an output image corresponding to a luminance of the input image, wherein a range of the luminance of the output image is narrower than a range of the luminance of the input image, based on the feature amount, for each divided region; and
 (e) a compression unit configured to perform operation for compression of a dynamic range to generate data of the output image using the compression curve for each of the divided regions, on the input image, wherein the generation unit generates the compression curves of the respective divided regions so that the respective slopes of the compression curves of the divided regions match in a range from a luminance of a dark region of the input image to a luminance of a predetermined brightness of the input image, which is brighter than the luminance of the dark region.

22. The storage medium according to claim 21, wherein the generation unit generates the compression curves of the respective divided regions so that the respective slopes of the compression curves of the divided regions match in a range from the minimum luminance of the input image to a luminance of a predetermined brightness of the input image, which is brighter than the luminance of the dark region.

23. The storage medium according to claim 22, wherein the luminance of the predetermined brightness is a luminance of exposure point of 18% grey in a capturing the image by the camera.

24. The storage medium according to claim 21, wherein the luminance of the predetermined brightness is a luminance of exposure point of 18% grey in a capturing the image by the camera.

* * * * *